(12) United States Patent
Ho et al.

(10) Patent No.: US 7,623,235 B2
(45) Date of Patent: Nov. 24, 2009

(54) CURVED GRATING SPECTROMETER WITH VERY HIGH WAVELENGTH RESOLUTION

(75) Inventors: Seng-Tiong Ho, 120 Picardy La., Wheeling, IL (US) 60090; Seongsik Chang, Santa Clara, CA (US); Yingyan Huang, Evanston, IL (US)

(73) Assignee: Seng-Tiong Ho, Wheeling, IL (US)

( * ) Notice: Subject to any disclaimer, the term of this patent is extended or adjusted under 35 U.S.C. 154(b) by 20 days.

(21) Appl. No.: 11/872,455

(22) Filed: Oct. 15, 2007

(65) Prior Publication Data
US 2008/0285919 A1 Nov. 20, 2008

Related U.S. Application Data

(63) Continuation-in-part of application No. 10/708,730, filed on Mar. 20, 2004, now Pat. No. 7,283,233.

(51) Int. Cl.
*G01J 3/28* (2006.01)

(52) U.S. Cl. .................. 356/328; 356/334; 359/570
(58) Field of Classification Search .............. 356/305, 356/328, 334; 385/37; 359/566–576
See application file for complete search history.

(56) References Cited

U.S. PATENT DOCUMENTS

| 4,380,393 | A | 4/1983 | Nagata et al. |
| 4,820,046 | A | 4/1989 | Sohma et al. |
| 5,114,231 | A | 5/1992 | Gautherin et al. |
| 9,916,701 | | 7/2001 | Ooi et al. |
| 6,339,662 | B1 | 1/2002 | Koteles et al. |

*Primary Examiner*—Tarifur Chowdhury
*Assistant Examiner*—Jonathon D Cook
(74) *Attorney, Agent, or Firm*—Andrus, Sceales, Starke & Sawall, LLP

(57) ABSTRACT

The present application discloses a system comprising a compact curved grating (CCG) and its associated compact curved grating spectrometer (CCGS) or compact curved grating wavelength multiplexer/demultiplexer (WMDM) module and a method for making the same. The system is capable of achieving a very small (resolution vs. size) RS factor. In the invention, the location of the entrance slit and detector can be adjusted in order to have the best performance for a particular design goal. The initial groove spacing is calculated using a prescribed formula dependent on operation wavelength. The location of the grooves is calculated based on two conditions. The first one being that the path-difference between adjacent grooves should be an integral multiple of the wavelength in the medium to achieve aberration-free grating focusing at the detector or output slit (or output waveguide) even with large beam diffraction angle from the entrance slit or input slit (or input waveguide). The second one being specific for a particular design goal of a curved-grating spectrometer. In an embodiment, elliptical mirrors each with focal points at the slit and detector are used for each groove to obtain aberration-free curved mirrors.

13 Claims, 16 Drawing Sheets

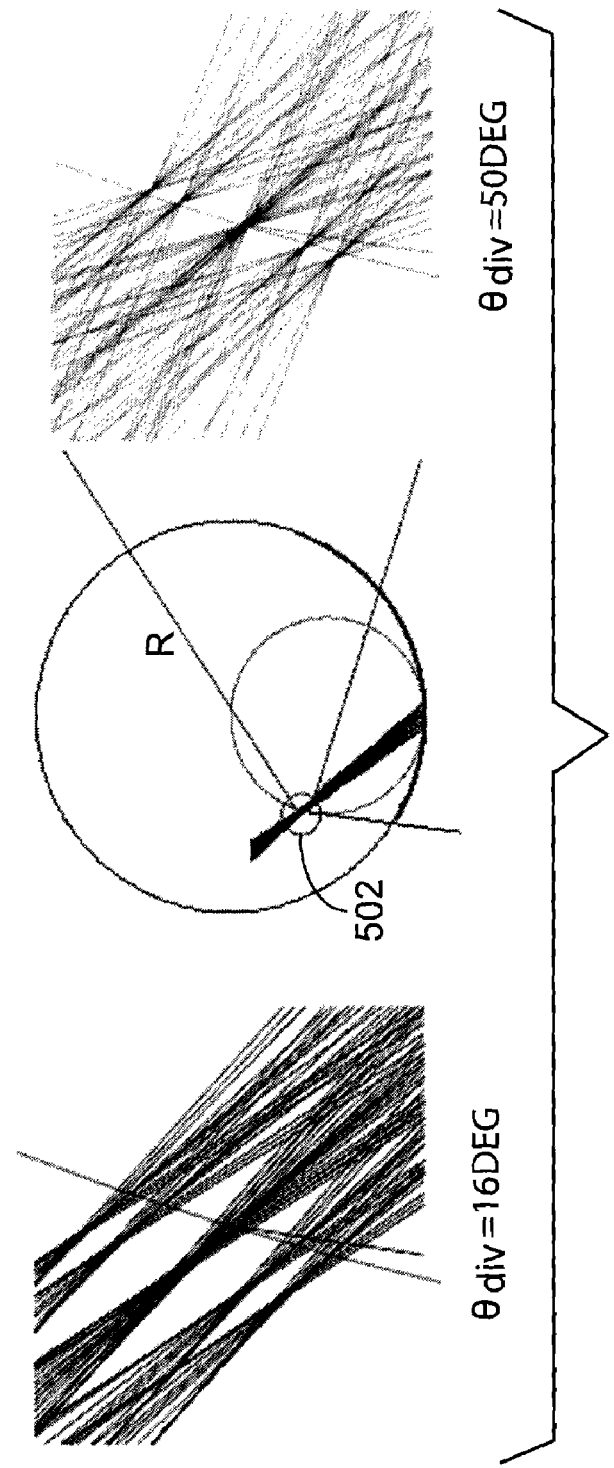

CURVED GRATING SPECTROMETER WITH VERY HIGH WAVELENGTH RESOLUTION

CROSS REFERENCE TO RELATED APPLICATIONS

This application is a Continuation-In-Part of U.S. patent application Ser. No. 10/708,730, filed Mar. 20, 2004 now U.S. Pat. No. 7,283,233. This application is related to U.S. patent application Ser. No. 09/916,701, "Method for shifting bandgap energy of quantum well layer" filed Jul. 26, 2001 in the names of Boon-Siew Ooi and Seng-Tiong Ho, the disclosure of which is incorporated herein by reference. This application is related to U.S. Patent Application Ser. No. 60/242,219, "Method for shifting bandgap energy of quantum well layer" filed Oct. 20, 2000, in the names of Boon-Siew Ooi and Seng-Tiong Ho, the disclosure of which is incorporated herein by reference. This application is related to U.S. Patent Application Ser. No. 60/430,507, "Method for quantum-well intermixing using pre-annealing enhanced defect diffusion" filed Dec. 3, 2002, in the names of Boon-Siew Ooi and Ruiyu (Jane) Wang, the disclosure of which is incorporated herein by reference.

BACKGROUND OF THE INVENTION

The present invention relates to semiconductor photonic and opto-electronic devices. In particular, the present invention relates to an integrated optical wavelength multiplexers and demultiplexers and method of making the same.

Optical gratings are well known in the art and are used to disperse optical spectra spatially. Such gratings are commonly used in optical spectrometers to analyze the spectra composition of an optical beam. There is always a trade off between the length of an optical spectrometer and its resolution. Thus, if a higher wavelength resolution is required, the length required is also longer. Consider an example of a typical 1-meter long grating spectrometer in the market, which has a wavelength resolution of about $\Delta\lambda=0.1$ nm at $\lambda=1000$ nm or $\Delta\lambda/\lambda=10^{-4}$. The dimensionless quantity for the length of the spectrometer L is $L/\lambda$ and $L/\lambda=10^6$ in this example. The dimensionless product of the relative resolution $\Delta\lambda/\lambda$ and the relative physical size $L/\lambda$ of the spectrometer is dependent on the design of the spectrometer and in this example, spectrometer gives $(\Delta\lambda/\lambda)\times(L/\lambda)=100=RS$. This factor (RS) in generally referred to as the "resolution vs size" factor. RS basically measures the compactness of a spectrometer for a given resolution power. The smaller the RS value, the more compact is the spectrometer. Only a few conventional spectrometers have RS factor less than about 10. This is primarily because of the various limitations in the current art (as will be described below).

It is known in the art that a relatively compact spectrometer can be achieved using a curved grating. The schematics of such a grating spectrometer is shown in FIG. 1A, illustrating an optical beam 1 entering an entrance slit 2 with slit size $w_1$. The beam, after slit 2, undergoes wave diffraction towards a curved grating 3, which diffracts the beam spatially in a direction that is dependent on the optical wavelength of the beam. The curvature of the grating helps to refocus the diffracted beam to an exit slit 4 with slit size $w_2$. Light through slit 4 is then detected by a photo detector 5. As is well known to those skilled in the art, the commonly used design for the curved grating 3 is the Rowland design. In the Rowland design, the grating has a circularly curved shape of radius R 6 and the slits SL1 and SL2 lie in a circle of radius R/2 7 as shown in FIG. 1A. The grating is ruled using a diamond tip with constant horizontal displacement d, which ruled the curved surface with constant Chord lines C1, C2, C3 and so forth, as shown in FIG. 1B. The segment lengths, S1, S2, S3 and so forth, along the curved surface are not a constant and vary along the curved surface.

Let the diffraction full angle from the entrance slit 1 be $\theta_{div}$. As is well known to those skilled in the art, $\theta_{div}=2\lambda/d$ (in Radian). Let length L be the distance between the grating center and entrance slit 1, which is also approximately the distance between the grating center and the exit slit 4. as is well know to those skilled in the art, the resolution of the spectrometer increases with decreasing slit size $w_2$. The imaging through the curved grating requires $w_1$ and $w_2$ to be about equal. a smaller slit size $w_1$ and $w_2$ to be about equal. A smaller slit size $w_1$, however, leads to a larger diffraction angle $\theta_{div}$. It can be shown that the Rowland design works reasonably well up to $\theta_{div}<4°$. When $\theta_{div}>4°$, the Rowland design could not give a sharp enough focus at the exit slit 4 (for $\Delta\lambda<0.1$ nm), thereby limiting the size of $w_2$ and hence the resolution of the spectrometer. A diffraction angle of $\theta_{div}=4°$ corresponds to a slit size of about 25 microns (for $\lambda=1000$ nm). In the current art, it is typically difficult to make slit size smaller than 25 microns, and Rowland design is adequate for most present spectrometers with slit sizes larger than 25 microns.

Aberration limitation. In the case of the Rowland design, when $\Theta_{div}>4$ DEG, serous aberration in the refocusing beam will occur to limit wavelength resolution. This is shown in FIG. 1C illustrating the ray tracing for the typical Rolwand-Echelle design at 4, 8, and 16 DEG diffraction. The ray tracing will allow us to see potential focusing distortion or aberration at the exit slit. In the figure, we show the focusing behavior for two sets of rays with wavelengths separated by 0.4 nm. From the figure, we see that their focused spots clearly separate when $\Theta_{div}=4$ DEG. However, when $\Theta_{div}=8$ DEG, the focused spots began to smear out. There is substantial distortion for the focusing rays when $\Theta_{div}>4$ DEG. Further simulations based on numerical solutions to Maxwell's wave equations using finite-difference time-domain (FDTD) method also show similar onset of focused spot size distortion at $\Theta_{div}>4$ DEG. In short, the current designs are close to their resolution-size (RS) limits and cannot be made substantially more compact without losing wavelength resolution.

As discussed above, a curved-grating spectrometer is well specified by geometric configurations of its components as shown in FIG. 2. First, the location of the entrance slit; this is usually given by an $\theta_1$ with respect to the normal of the grating center and the distance $S_1$ from the grating center. The center of the grating refers to the part of the grating hit by the center, i.e. high intensity point, of the entrance beam. Second, the locations of the first two grooves at the grating center; these are specified by its location vectors $X_1$ and $X_{(-1)}$ with respect to the grating center $X_0=0$ and its groove spacing (or pitch) $d_1=|X_1-X_0|$ and $d_{-1}=|X_{(-1)}-X_0|$. $X_1$ and $X_{(-1)}$ are located symmetrically opposite to each other with respect to the grating center and therefore $d=d_1=d_{(-1)}$. A circle can be defined by these three points $X_0$, $X_1$, and $X_2$ and its radius is referred to as the radius is referred to as the radius of curvature at the grating center. Third, the location of the exit slit i.e. the location of the detector; this is specified by an angle $\theta_2$ with respect to the normal of the grating center and the distance $S_2$ from the grating center. For a given operating wavelength center $\lambda_c$, the initial groove spacing d is usually chosen to satisfy the diffraction grating formula for a given entrance slit and detector location. The curved grating is further specified by the location of other grooves (specified by its location vector $X_i$, with respect to the grating center $X_0=0$ and the groove spacing $d_i$ from the previous groove given by $d_i=|X_iX_{i-1}|$. Let the total number of groove be N in each side of the grating center, the locus of all the groove $X_{(-N)}, \ldots, X_{(-1)}, X_0, X_1, \ldots, X_N$ form a curved shape, which can lie in a circle or in any other curvilinear line. Curved shape of the grating acts as an imaging element of the spectrometer.

The shape of each groove centered at $X_i$ is not critical to the resolution power of the grating and hence is not necessary to be a part of the main specification. However, the groove shape is related to the diffraction efficiency. For example, in order to increase the diffraction efficiency at a particular diffraction angle $\theta_2$, it is typically made a planar surface for each groove, oriented in such a way that it acts like a tiny mirror reflecting the input ray towards the angle $\theta_2$, a process typically referred to as blazing to angle $\theta_2$ (for a given wavelength $\lambda$). A section of each groove which reflects light is physically a two-dimensional surface of a particular shape, not a one-dimensional curve. However, the geometric shape of a groove is usually referred to as a curve of a particular shape. This is because there is no variation in the grating shape in the direction perpendicular to the plane where grating lies. Especially, spectrometers within a planar waveguide are strictly two-dimensional in their nature and the shape of grating or grooves will be referred with a curve, not with surface.

Conventional Rowland design spectrometers are specifically configured by the design rule described below in conjunction with FIG. 3.

Referring to FIG. 3, the entrance slit is located on a circle of R/2, where R is the radius of curvature at the grating center. This circle of radius R/2 is called as Rowland circle and it is tangent to the grating center. In the Rowland design, the distance $S_1$ of the entrance slit to the grating center is related to the angle of incidence $\theta_1$ by $S_1 = R \times \cos\theta_1$.

The detector is also located on the same Rowland circle as the entrance slit. In the Rowland design, the distance $S_2$ of the detector to the grating center is related to the angle of diffraction $\theta_2$ by $S_2 = R \times \cos\theta_2$.

The relation between $\theta_1$, $\theta_2$, and the initial groove spacing d is given by the grating formula, $$d(\sin\Theta_2 - \sin\Theta_1) = m\lambda_c/n \quad (1)$$

where m is the diffraction order, n is the refractive index of the medium, $\lambda_c$ is the center of the operation wave-length. This grating formula is a so-called far-field approximation, which is valid only when $S_1$ and $S_2$ are much larger than d.

Initial groove positions are $X_0=(0,0)$, $X_1=(d, R-(R^2-d^2)^{1/2})$ and $X_{-1}=(-d, R-(R^2-d^2)^{1/2})$. These three initial grooves with position vectors $X_0$, $X_1$, and $X_{-1}$, are located on a circle of radius R and have the initial groove spacing of d along a chord parallel to the grating tangent.

All other grooves, specified by its position vector $X_1$'s, are located on the same circle of radius R defined by the initial three groove positions X, X, and $X_{-1}$. $X_1$'s are also equally spaced along a chord that is parallel to the tangent of the grating center. In other words, the projection of the displacement vector $X_1-X_{i-1}$ on this chord always has the same length. Specifically, the position vectors of these grooves can be written as $x_i=(di, R-(R^2-(di)^2)^{1/2})$, and $X_{-i}=(di, R-(R^2-(di)^2)^{1/2}$.

For example, if the radius of curvature at the grating center is r=100 μm, the Rowland circle, where the entrance slit and the detector are located, has the radius of 50 μm. Here, we assume that tangent line at the grating center is parallel to the x-axis. Since the Rowland circle is tangent to the grating center, it circles by passing both the grating center $X_0=(0,0)$ and a point (0, 50). If the angle of the entrance slit is $\theta_1=45°$, the distance of the entrance slit to the grating center is $S_1=R \times \cos\theta_1=70.71$ μm. In terms of (x,y)-coordinate, the entrance slit is located at (−50, 50). It is well-known that grating is more efficient if the propagation direction of the diffracted light from the grating is parallel and opposite to the propagation direction of the input beam. Such a scheme is known as Littrow configuration and is widely used for a high-efficiency spectrometer. A Littrow configuration in the Rowland design will be equivalent to having the angle of detector being almost equal to the angle of the entrance slit, i.e., $\theta_1 \approx \theta_2$. In order to have Littrow configuration, the groove spacing d at the grating center has to be properly chosen so that it satisfies grating formula Eq. 1. For example, when the center wavelength is 1550 nm and the angle of entrance slit is $\theta_1=45°$, the diffraction order of m=12 of a grating with the groove spacing of d=4.2 μm at its center propagate toward a detector located at $\theta_2=37.37°$, which is close to the Littrow configuration. The detector location can be fine tuned by changing the initial groove spacing d. Lower the groove spacing d, larger the detector angle $\theta_2$. For the groove spacing d=4.2 μm and radius of curvature R=100 μm, the initial three positions of grooves are $X_0=(0,0)$, $X_1=(4.2, 0.088)$ and $X_{-1}=(-4.2, 0.088)$.

In the Rowland design, other grooves are located such that their spacing is the same along a chord parallel to the grating tangent at the center. Therefore, the position vectors of other grooves are $X_i=(di, R-(R^2-(di)^2)^{1/2})=(4.2i, 100-(100^2-(4.2i)^2)^{1/2})$, and $X_{-i}=(-di, R-(R^2-(di)^2)^{1/2})=(-4.2i, 100-(100^2-(4.2i)^2)^{1/2})$. The position vectors of the grooves are listed in the following table for the case of Rowland design with R=100 μm, d=4.2 μm, m=12, $\theta_1=45°$, and $\theta_2=37.37°$ for an operation wavelength of $\lambda_c=1550$ nm.

TABLE 1

| | |
|---|---|
| $X_{-13}$ | (−54.6, 16.221) |
| $X_{-12}$ | (−50.4, 13.630) |
| $X_{-11}$ | (−46.2, 11.312) |
| $X_{-10}$ | (−42, 9.248) |
| $X_{-9}$ | (−37.8, 7.419) |
| $X_{-8}$ | (−33.6, 5.814) |
| $X_{-7}$ | (−29.4, 4.419) |
| $X_{-6}$ | (−25.2, 3.227) |
| $X_{-5}$ | (−21, 2.230) |
| $X_{-4}$ | (−16.8, 1.421) |
| $X_{-3}$ | (−12.6, 0.797) |
| $X_{-2}$ | (−8.4, 0.353) |
| $X_{-1}$ | (−4.2, 0.088) |
| $X_0$ | (0, 0) |
| $X_1$ | (4.2, 0.088) |
| $X_2$ | (8.4, 0.353) |
| $X_3$ | (12.6, 0.797) |
| $X_4$ | (16.8, 1.421) |
| $X_5$ | (21, 2.230) |
| $X_6$ | (25.2, 3.227) |

The advent in Dense Wavelength Division Multiplexing (DWDM) optical communication networks, however, requires that the multiple wavelengths in an optical fiber to be analyzed by spectral analysis devices that are much smaller in size than that of the current grating spectrometer. The challenge is to circumvent the current limitation in grating spectrometer design and fabrication methods. As discussed above, the current design basically cannot achieve the Resolution-Size factor (RS) much smaller than about 10. While several current technologies are capable of using planar waveguide technologies to make grating based spectrometers on a single silica or semiconductor substrate, they are still not able to achieve RS much smaller than 10 due to the basic limitations of the grating spectrometer design. Achieving a smaller RS factor is important for combining or integrating high-resolution grating spectrometers with various photonic devices (such as lasers, modulators, or detectors in a compact module or silica/silicon/semiconductor wafer).

These wave-length-division-multiplexed (WDM) integrated photonic devices or modules would be of great importance for applications to DWDM networks. The costs of these integrated WDM devices are typically proportional to their sizes. The wavelength dispersion elements, such as the grating spectrometer or other form of wavelength filters, are typically about 100 times larger in size than any other photonic devices in the module or wafer. In order to reduce their costs substantially, it is desirable to reduce the size of these wavelength dispersion elements to as small a size as possible.

Thus, it is desirable to have grating based spectrometers that have an RS factor of less than 10. It is also desirable to reduce the size, and hence the cost, of integrated WDM devices that are used in DWDM networks. The present invention discloses such a device and a method for making the same.

SUMMARY OF THE INVENTION

It is an aim of the invention to provide a compact curved grating and associated compact curved grating spectrometer or wavelength Mux/deMux with integration possibility that is capable of achieving very small RS factors thereby enabling high resolution at small size.

It is another aim of the invention to provide a compact curved grating spectrometer module that can be used as an isolated optical spectrometer using discrete optical spectrometer module or wavelength Mux/deMux module with integration possibility that can be used as an isolated optical spectrometer using discrete optical components.

It is another aim of the invention to provide a compact curved grating spectrometer module that can be used as a wavelength dispersion element in a photonic integrated circuit.

In order to attain the above-mentioned aims, a compact curved grating and associated compact curved grating spectrometer or wavelength Mux/deMux with integration possibility is provided. The compact curved grating spectrometer includes an entrance slit, a detector and a curved grating and the compact curved grating wavelength Mux/deMux with integration possibility includes at least an input slit or waveguide and at least an output slit or waveguide for propagating through at least an input light beam and at least an output light beam, respectively. The locations of the entrance slit and the detector or the input slit (or waveguide) and the output slit (or waveguide) can be adjusted to control the performance of the spectrometer or wavelength Mux/deMux. The distance between the grooves of the gratings depend on the location of the entrance slit or the input slit (or waveguide), the detector or the output slit (or waveguide), the center of the operation wavelength, the diffraction order and the refractive index of the medium.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which FIG. 5A describes the Comparison of angular resolution for Rowland gratin (left) with input divergence angle 16DEG and the HR-CCG design with large-angle aberration correction at input divergence angle 50DEG (right)

DETAILED DESCRIPTION

The present invention discloses a system comprising a compact curved grating (CCG), it associated compact curved grating spectrometer (CCGS) or wavelength Mux/deMux (WMDM) module and a method for making the same. The system is capable of achieving very small (resolution vs. size) RS factor. The uses of CCGS or WMDM module include an isolated optical spectrometer or wavelength Mux/deMux using discrete optical components such as slits, grating, spectrometer or wavelength Mux/deMux casing, detector, detector array, and motor drive. More generally, the CCGS or WMDM module could also be used as a wavelength dispersion element in a photonic integrated circuit. The photonic integrated circuit can be based on either of glass (silica) waveguide, semiconductor waveguide (including but not limited to, polymer waveguide, or any other type of optical waveguiding devices. Semiconductor waveguides include silicon or compound semiconductor waveguides such as III-V (GaAs, InP etc). The wavelength dispersion element based on the CCGS or WMDM module in the photonic integrated circuit can be integrated with optical detector, laser, amplifier, modulator, splitter, multimode interference devices, other wavelength filters, array-waveguide-based devices, and other photonic devices, materials, or components to achieve a multi-component photonic integrated circuit with useful functionalities. The CCG explained below is a High Resolution Compact Curved Grating (HR-CCG) that tries to alleviate the disadvantages associated with prior art mentioned earlier, by providing a high resolution in a small (compact) module.

Figure 5B:
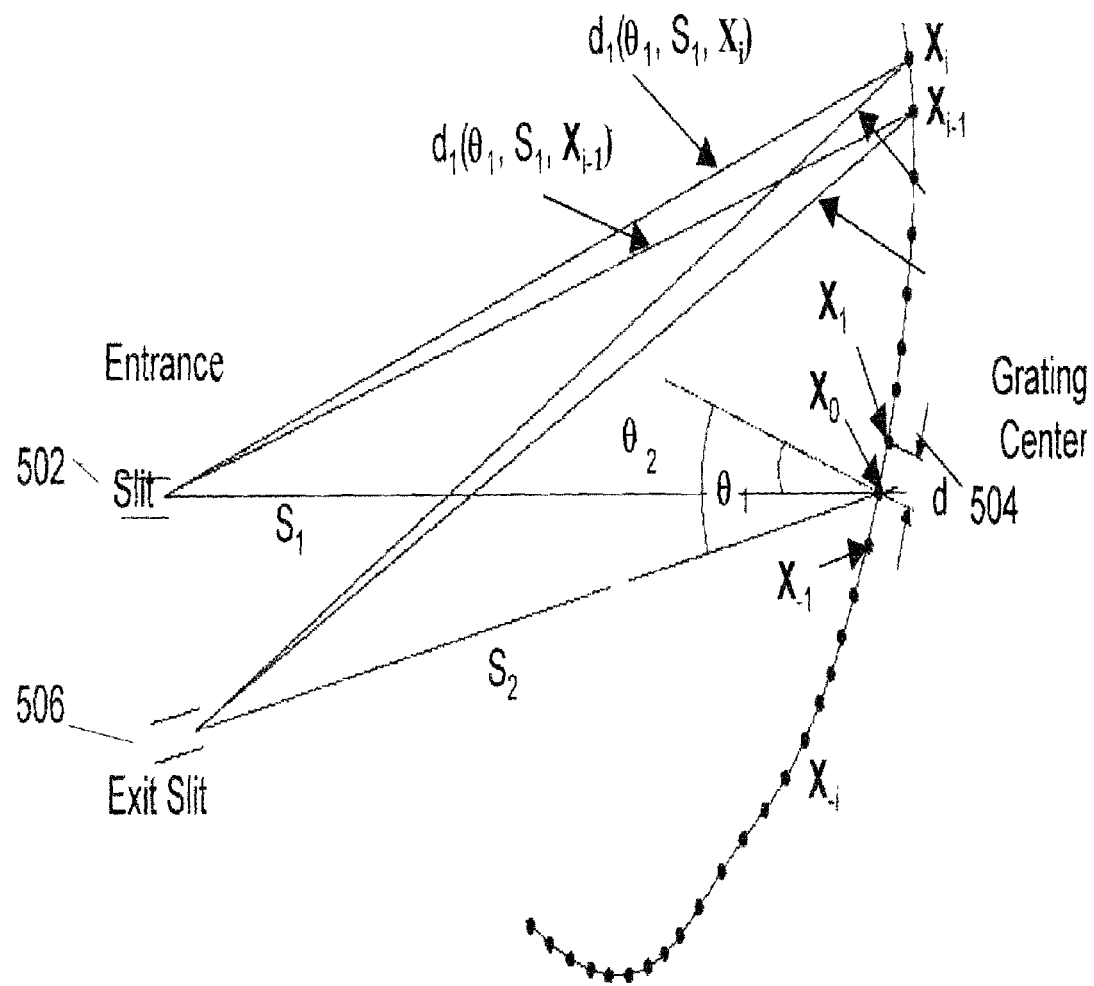
FIG. 5B describes High Resolution Compact Curved Gratin specifications in accordance with a preferred embodiment of the present invention.

We have improved on the current Rowland design, enabling curved-grating spectrometer with 10-100× smaller linear size (or 100-10,000× smaller area) using our HR-CCG with large-angle aberration-corrected design. The typical Rowland design can only reach a useful diffraction angle $\Theta_{diff}$ of ~4 DEG, beyond which serous aberration in the refocusing beam will occur to limit wavelength resolution. In FIG. 5A we show the angular resolution of the typical Rowland design at 16 DEG diffraction angle compared with our HR-CCG design at 50 DEG. We see that our "large-angle aberration-corrected grating" design has much better angular resolution: different direction rays are well converged to a point on the focal circle. This translates to much smaller RS factor or size. We have used discrete time solution of vectorial Maxwell's equations to simulate the HR-CCG design, which verified the high resolution nature of our grating as predicted by the ray-tracing method.

Figure 9:
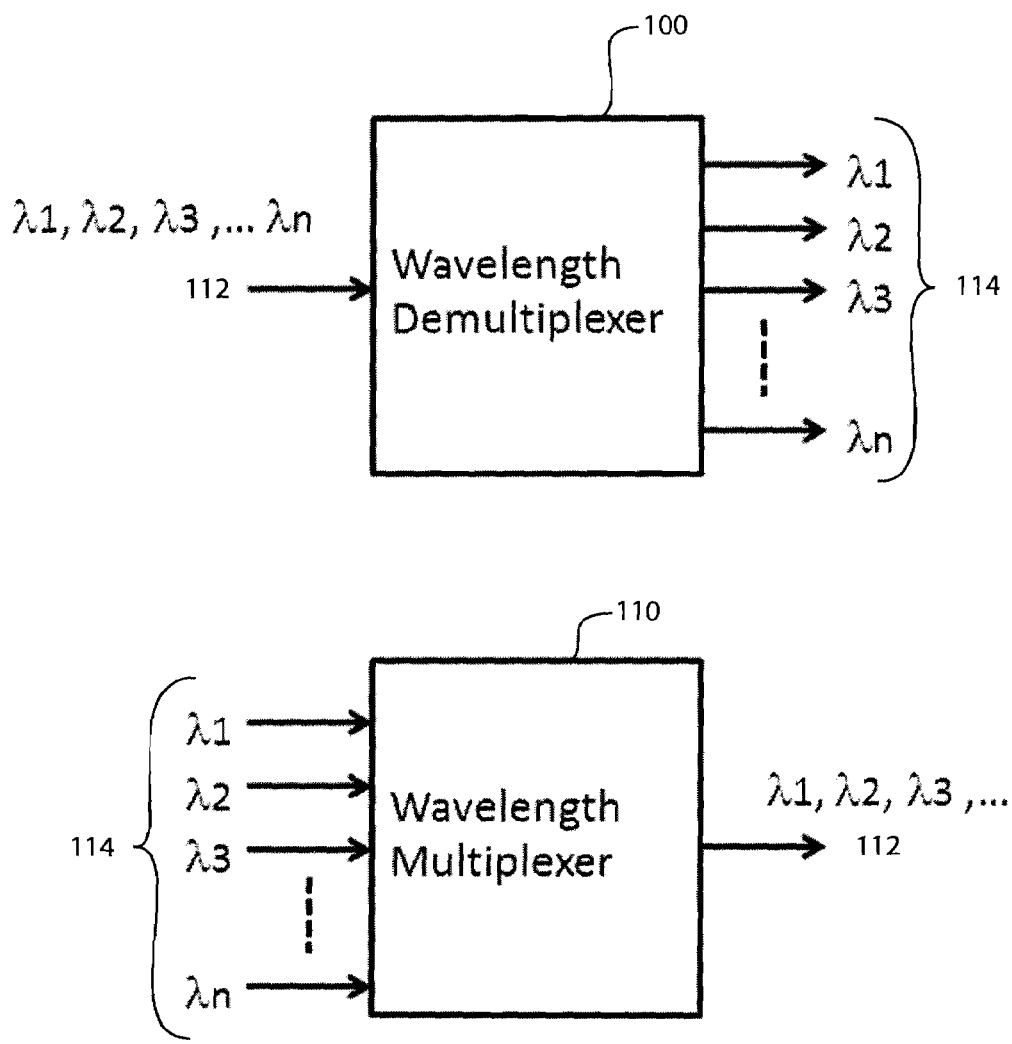
FIG. 9 illustrates a block diagram of a wavelength demultiplexor and a wavelength multiplexor.

Referring to FIG. 9, a wavelength demultiplexer (wavelength deMux) 100 is a device in which multiple wavelengths in a beam of light 112 are separated into several different beams of light 114. A wavelength multiplexer (wavelength Mux) 110 is a device in which multiple wavelengths in several beams of light 114 are combined to a single beam of light 112.

Referring to FIG. 9, a wavelength demultiplexer (wavelength deMux) 100 is a device in which multiple wavelengths in a beam of light 112 are separated into several different beams of light 114. A wavelength multiplexer (wavelength Mux) 110 is a device in which multiple wavelengths in several beams of light 114 are combined to a single beam of light 112.

Figure 10:
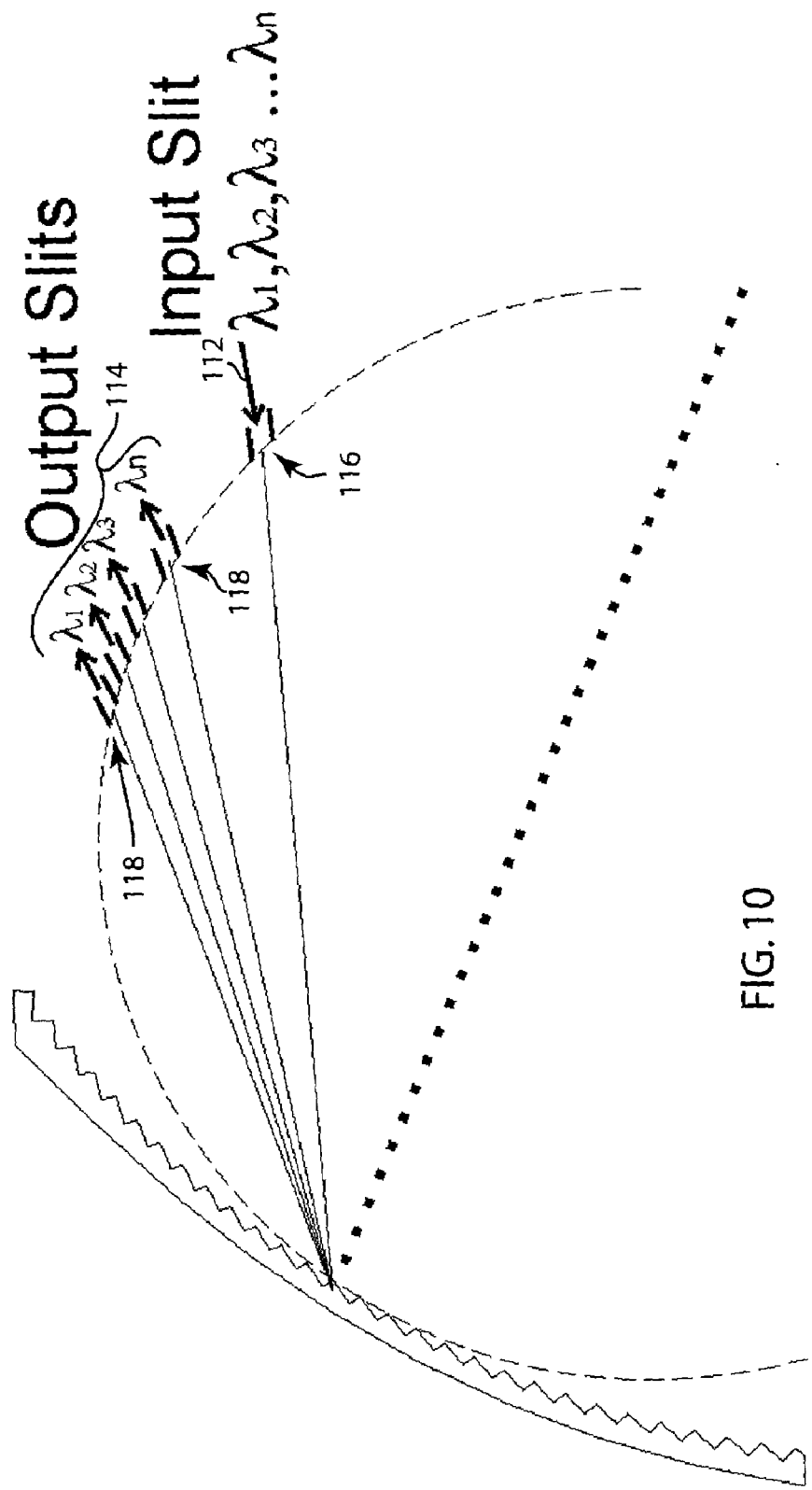
FIG. 10 illustrates a curved grating spectrometer configured as a wavelength multiplexor.

Referring to FIG. 10 a curved grating spectrometer functions as a wavelength deMux 100 if it has an input slit 116 at the input beam 112 location so that the multiple wavelengths in the input beam will be diffracted to several output points 114 and several output slits 118 are placed at the locations of the spectrometer detectors mentioned above at these output points to form several output beams each with a different wavelength. The output slits 118 replace the detectors so that no detectors will be used.

Figure 11:
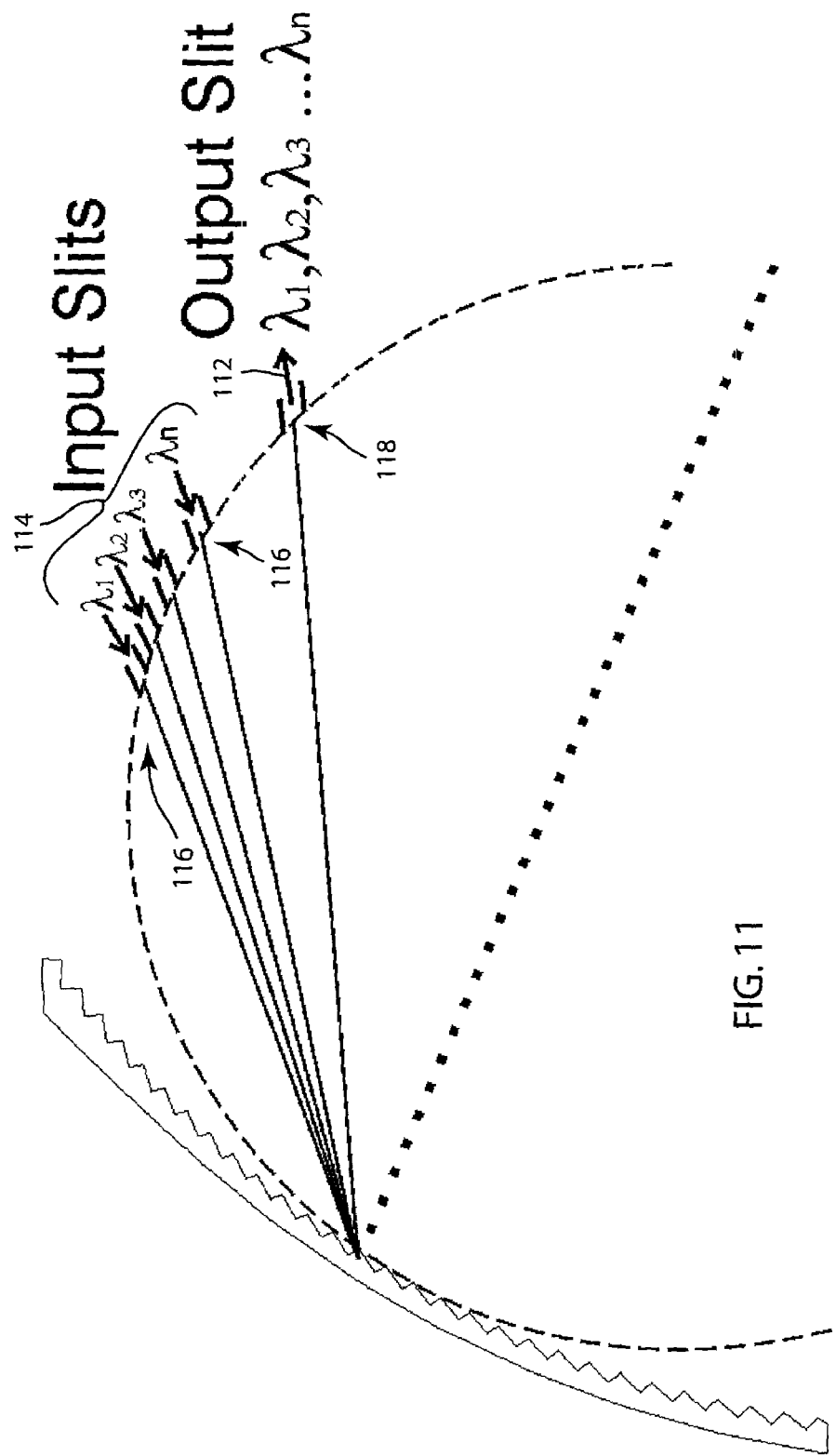
FIG. 11 illustrates a curved grating spectrometer configured as a wavelength multiplexor.

Referring to FIG. 11, a curved grating spectrometer functions as a wavelength Mux 110 if it has multiple input slits 116, each slit placed at an input beam's 114 location so that all the input beams 114 will be diffracted to the same output point and an output slit 118 is placed at the location of the spectrometer detector mentioned above so that the output slit 118 will give a single output beam of light 112 with the combined wavelengths of light. The output slit 118 replaced the detector so that no detector will then be used.

Figure 12:
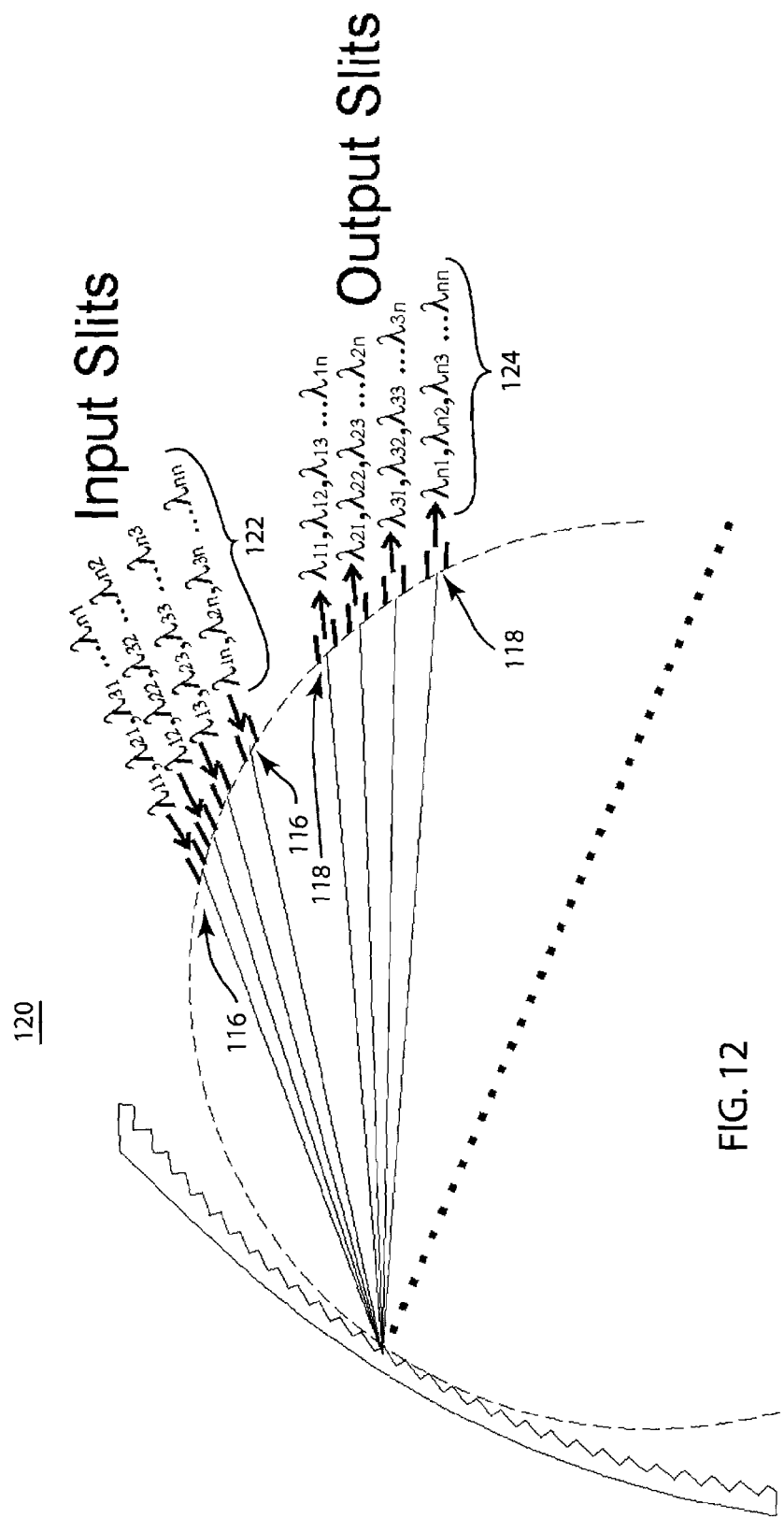
FIG. 12 illustrates a curved grating spectrometer configured as a wavelength multiplexor/demultiplexor.

Referring to FIG. 12, a more general wavelength Mux/deMux device 120 will have multiple input slits 116 and multiple output slits so that several input beams of light 122, each input beam with one or more wavelengths, are dispersed to form several output beams of light 124, each output beam with one or several wavelengths.

Figure 13:
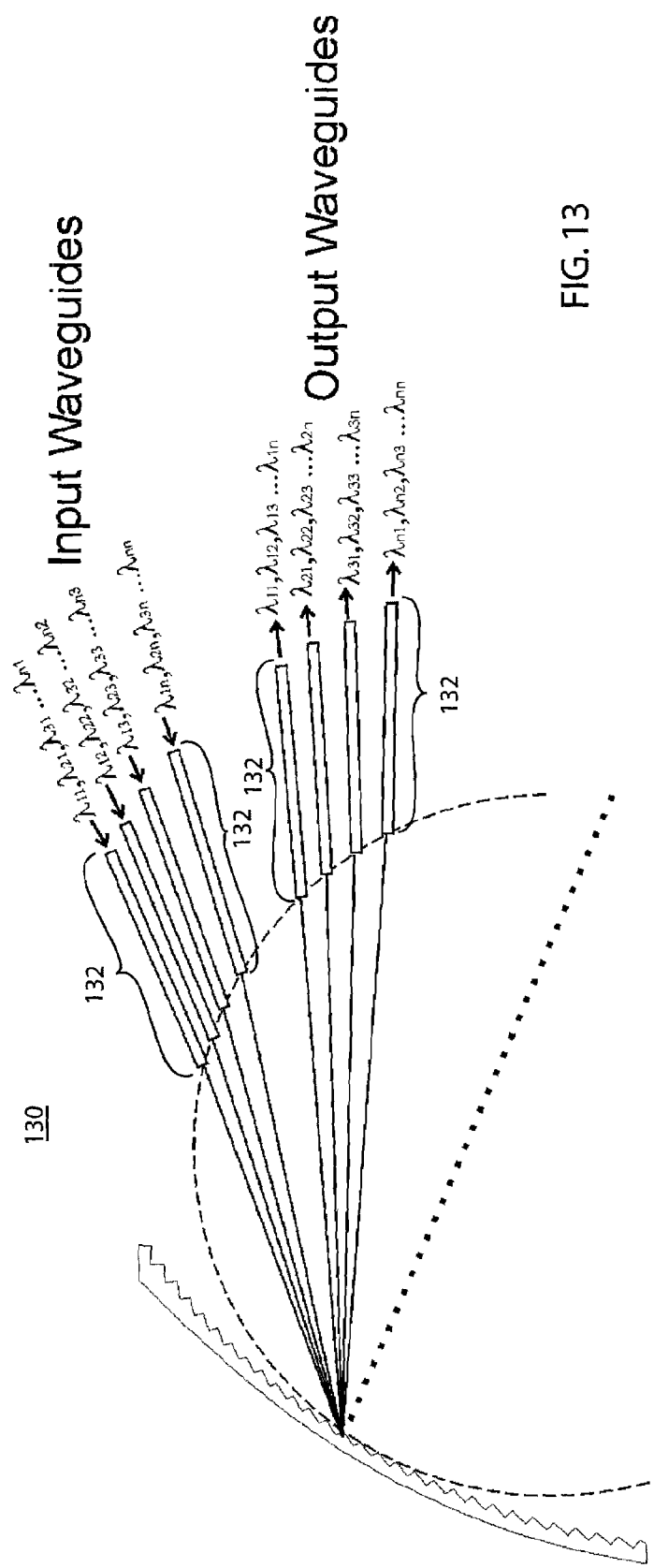
FIG. 13 illustrates a wavelength spectrometer configured as a multiplexor/demultiplexor with waveguides.

Referring to FIG. 13, an integrated version of the wavelength Mux/deMux device 130 will use optical waveguides 132 replacing input and output slits in which the mouth of each waveguide 132 will be at the location of the slit it is replacing. As is known to those skilled in the art, the waveguides 132 can be formed by optical fibers or with multiple-layer dielectric materials with high-refractive-index core to guide optical waves in the form of channel or planar waveguides 132. Such channel or planar waveguides can be formed on a common substrate 132.

First, the location of entrance slit or input slit (or waveguide) 502 can be adjusted in order to have the best performance for a particular design goal. Thus, the location of a entrance slit 502 specified by angle $\theta_1$ with respect to the normal of grating center 504 and the distance $S_1$ from grating center 504 is not necessarily on a circle as in the case for Rowland design mentioned in the prior art.

Second, the location of detector or output slit (or waveguide) can be adjusted in order to have the best performance for a particular design goal. Thus, the location of detector or output slit (or waveguide) 506, specified by the angle $\theta_2$ with respect to the normal of grating center 504 and the distance $S_2$ from the grating center is not necessarily on the same circle where entrance slit or input slit (or waveguide) 502 is located, nor on any other circle.

Third, The relation between $\theta_1$, $\theta_2$, and the initial groove spacing d is given by the grating formula, $$d(\sin\Theta_2 - \sin\Theta_1) = m\lambda_c/n \quad (1)$$

where m is the diffraction order, n is the refractive index of the medium, and $\lambda_c$ is the center of the operation wavelength.

Fourth, the initial groove positions are $X_0=(0,0)$, $X_1=(d, R-(R^2-d^2)^{1/2})$ and $X_{-1}=(-d, R-(R^2-d^2)^{1/2})$ With these position vectors, three initial grooves are located on a circle radius R and have the initial groove spacing of d at the grating center.

Fifth, location of other grooves $X_i$'s are obtained by two conditions. The first of these conditions being that the path-difference between adjacent grooves should be an integral multiple of the wavelength in the medium. The first condition can be expressed mathematically by:

$$[d_1(\Theta_1,S_1,X_i)+d_2(\Theta_2,S_2,X_i)]-[d_1(\Theta_1,S_1,X_{i-1})+d_2(\Theta_2,S_2,X_{i-1})]=m\lambda/n, \quad (2)$$

(2)

where $d_1(\Theta_1,S_1,X_i)$ is the distance from a i-th groove located at $X_i$ to entrance slit 502 specified by $\Theta_1$ and $S_1$, $d_2(\Theta_2,S_2,X_i)$ is the distance from i-th groove located $X_i$ to detector 502 specified by $\Theta_2$ and $S_2$, m is the diffraction order, and n is the refractive index of the medium. This mathematical expression is numerically exact for the optical path difference requirement in the diffraction grating and is actively adjusted for every groove on HR-CCG.

The second of these conditions being specific for a particular design goal of a curved-grating spectrometer. The second condition in general can be mathematically expressed as $$f(\Theta_1,S_1,\Theta_2,X_i,X_{i-1},\lambda_c,n,m) = \text{const} \quad (3)$$

Specific examples of the second condition are described later in the application. The unknown real variables in both equations (2) and (3) are x- and y-coordinates of the location vector $X_i$ of the i-th groove. For given input-slit location ($\theta_1$, $S_1$), detector 506 location ($\theta_2$, $S_2$), and the previous, i.e., (i–1)-th, groove position $X_{i-1}$, $X_i$ is completely specified by equations 3 and 4 for a given center wave-length $\lambda_c$, refractive index n, and the diffraction order m.

The last of the HR-CCG specification ensures that every ray from each groove focuses to a single point. This ensures HR-CCG having a large acceptance angle, and therefore a small spot size.

Figure 6:
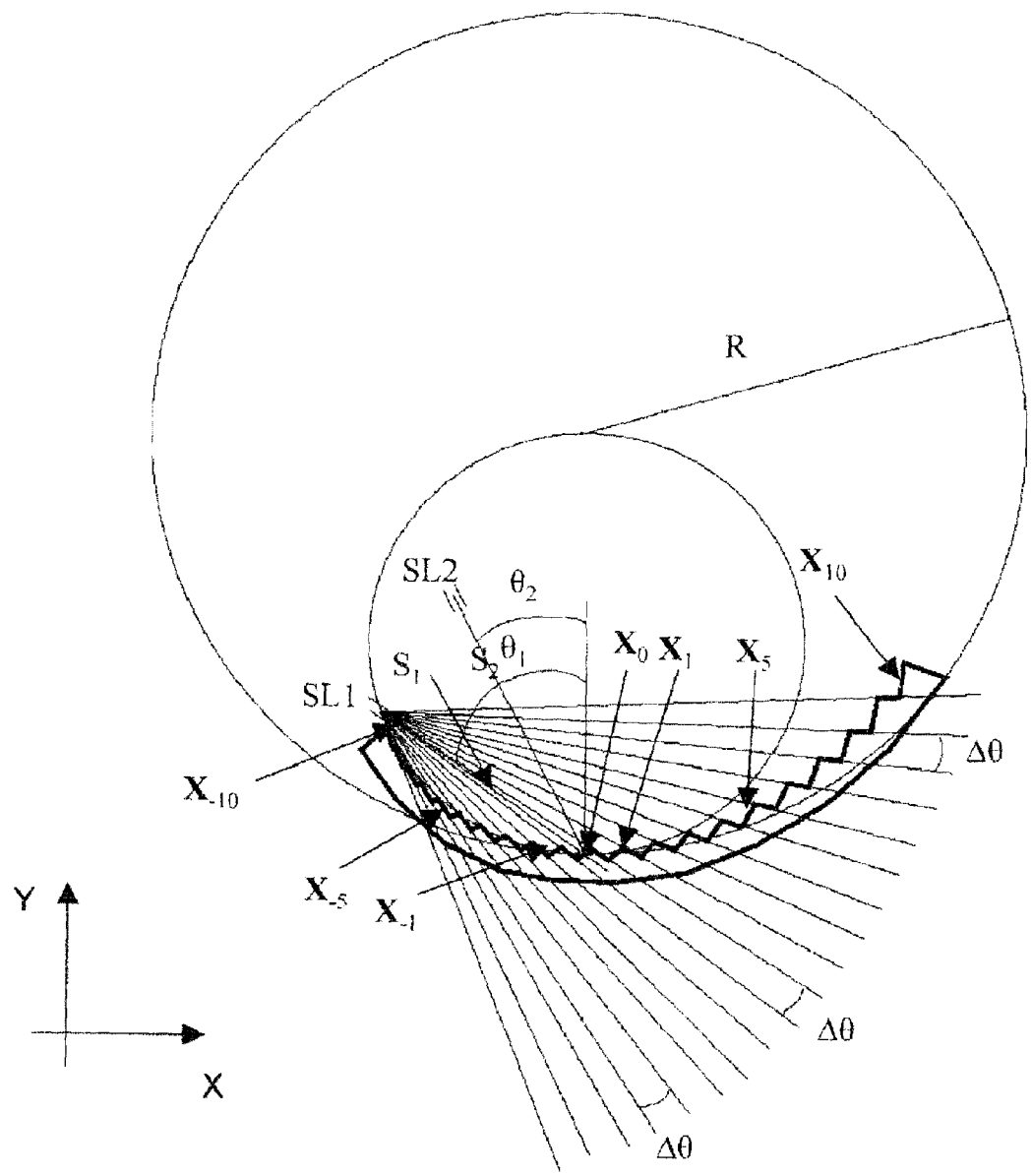
FIG. 6 illustrates an example of High Resolution Compact Curved Grating with constant angle.

An exemplary embodiment of HR-CCG specified above is shown in FIG. 6. The radius of curvature at the grating center is R=50 μm. Entrance slit or input slit (or waveguide) 502 is located at an angle $\Theta_1=55°$ from the grating normal and distance $S_1=28.68$ μm from the grating center. Detector or output slit (or waveguide) 506 is located at an angle $\Theta_2=27.2°$ the grating normal and distance $S_2=37.65$ μm from the grating center. The groove spacing at the grating center is chosen to be d=3.6 μm so that diffraction order m=10 is directed toward detector 506 located at $\Theta_2$. As shown in FIG. 6, entrance slit 502 and detector 506 is not located on a circle tangent to the grating center. Three initial grooves are located at $X_0=(0, 0)$, $X_1=(3.6, 0.13)$, and $X_{-1}=(-3.6, 0.13)$ which form a circle radius R=50 μm. Other groove locations $X_i$'s are obtained with the condition of each groove having a constant angular spacing from entrance slit 502 and optical path-difference condition (Eq. 2). In a mathematical form, this condition is expressed as, $$\cos(\Delta\theta_i) = \frac{(X_i - X_{in}) \cdot (X_{i-1} - X_{in})}{|X_i - X_{in}||X_{i-1} - X_{in}|} = const \quad (4)$$

where $X_{in}=(-S_1 \cdot \sin\theta_1, S_1 \cdot \cos\theta 1)$ is the position vector of entrance slit 502, $X_{det}=(-S_2 \cdot \sin\theta_2, S_2 \cdot \cos\theta_2)$ is the position vector of detector 506, and $\Delta\theta_i$ is the difference in angular position between successive $i^{th}$ and $(i-1)^{th}$ grooves. In Eq. 4, operator "·" means the inner product in vector analysis and defined as $A \cdot B \equiv |A||B| \cos\theta$. Because $\Delta\theta_i$ is constant for all grooves, it is same as the angular –position difference between the center groove at $X_0$ and the first groove at $X_1$, i.e.

$$\Delta\theta_1 = \arccos\frac{(X_1 - X_{in}) \cdot (X_0 - X_{in})}{|X_1 - X_{in}||X_0 - X_{in}|}$$

In this particular case, the position of entrance slit or input slit (or waveguide) 502, exit slit or output slit (or waveguide) 506 and the angular spacing between the grooves are $X_{in}=(-23.49, 16.45)$, $X_{det}=(-17.26, 33.46)$, and $\Delta\Theta_1=4.13°$. In this example, wave-font of the diverging input beam propagating toward the curved grating is sliced into a set of narrow beams with angular extension $\Delta\Theta$ by the curved-grating. Each beam with angular extension $\Delta\Theta$ undergoes reflective diffraction by each groove. At a particular wavelength, diffraction at a particular groove is equivalent to redirecting to a particular narrow beam into a detector 506 location with $\Theta_2$. The position vectors $X_i$'s calculated from Eq. (2) and Eq. (4) are listed in the Table 2. As shown in FIG. 6, the positions of grooves $X_i$ are not on a circle tangent to grating.

| | |
|---|---|
| $X_{-10}$ | (−23.17, 15.28) |
| $X_{-9}$ | (−22.24, 12.89) |
| $X_{-8}$ | (−20.97, 10.60) |
| $X_{-7}$ | (−19.36, 8.43) |
| $X_{-6}$ | (−17.42, 6.44) |
| $X_{-5}$ | (−15.17, 4.65) |
| $X_{-4}$ | (−12.62, 3.10) |
| $X_{-3}$ | (−9.80, 1.83) |
| $X_{-2}$ | (−6.74, 0.87) |
| $X_{-1}$ | (−3.60, 0.14) |
| $X_0$ | (0.00, 0.00) |
| $X_1$ | (3.60, 0.14) |
| $X_2$ | (7.30, 0.70) |
| $X_3$ | (11.06, 1.70) |
| $X_4$ | (14.83, 3.13) |
| $X_5$ | (18.57, 5.02) |
| $X_6$ | (22.22, 7.36) |
| $X_7$ | (25.73, 10.16) |
| $X_8$ | (29.06, 13.39) |
| $X_9$ | (32.16, 17.06) |
| $X_{10}$ | (34.98, 21.15) |

The above example has been used for illustration purposes only and should not be construed in any way as limiting the scope of the invention.

In an alternative embodiment, the High-Resolution Compact Curved Grating has Constant Arc and the Detector or output slit (or waveguide) is located on a tangent Circle. This embodiment is described below in detail.

In this exemplary embodiment, both entrance slit or input slit (or waveguide) 502 and detector or output slit (or waveguide) 506 are located on a circle tangent to the grating center as in the case of Rowland design mentioned earlier. However, grooves in this curved-grating are located such that the arc-length of each groove is the same. As a result, grooves are not located on a circle nor are spaced with equal distance.

There are two commonly used shapes of grooves in the grating used in the free-space spectrometer. They are straight line and sinusoidal shape. These two shapes are widely used because of ease of manufacturing process. For a curved-grating, ideal shape of reflecting surface not a straight line, but a curved shape of the reflecting surface not a straight line, but a curved shape that can image entrance slit 502 at detector 506 location. Ideal aberration-free curved mirror is an ellipse with its focal point located at source and image. Therefore, the ideal shape of the groove in a curved-grating is a section of ellipse with its focal points at the slit and the detector. In this embodiment, elliptic shape is used for each groove and the length of this elliptic shape in each groove is kept constant. Center positions of the grooves $X_i$'s in this example are determined so that the length of each elliptic groove is the same.

The geometric specification of the HR-CCG with constant arc-length and detector 506 at a tangent circle is as described below.

First, entrance slit or input slit (or waveguide) 502 is located on a circle tangent to the grating at its center (so-called tangent circle). Therefore, the angle $\theta_1$ and the distance $S_1$ of entrance slit or input slit (or waveguide) 502 with respect to the grating center is related by $S_1=R\cos\theta_1$, where R is the radius of curvature of the grating center.

First, entrance slit or input slit (or waveguide) 502 is located on a circle tangent to the grating at its center (so-called tangent circle). Therefore, the angle $\theta_1$ and the distance $S_1$ of entrance slit or input slit (or waveguide) 502 with respect to the grating center is related by $S_1=R\cos\theta_1$, where R is the radius of curvature of the grating center.

Third, the relation between $\Theta_1$, $\Theta_2$, and the initial grove spacing d is given by the grating formula, $d(\sin\Theta_2-\sin\Theta_1)=m\lambda_c/n$ where m is the diffraction order, n is the refractive index of the medium, and $\lambda_c$ is the center of the operation wavelength.

Fourth, initial groove positions are $X_0$ (0,0), $X_1=(d, R-(R^2-d^2)^{1/2})$ and $X_{-1}=(-d, R-(R^2-d^2)^{1/2})$ With these position vectors, three initial grooves are located on a circle of radius R and have the initial groove spacing of d at the grating center.

Fifth, the location of other grooves $X_i$'s are obtained by the following two conditions. The first condition being the path-difference between adjacent grooves should be an integral multiple of the wavelength in the medium, which s mathematically expressed as $$[d_1(\Theta_1,S_1,X_i)+d_2(\Theta_2,S_2,X_i)]-[\Theta_1,S_1,X_{i-1})+d_2(\Theta_2,S_2,X_{i-1})]=m\lambda/n \quad (2)$$

The arc-lengths of all the grooves are the same through-out the HR-CCG. This condition can be mathematically expressed as $$\Delta S_i = |X_i - X_{in}|\arccos\frac{\left(\frac{X_{i-1}+X_i}{2} - X_{in}\right) \cdot \left(\frac{X_i+X_{i+1}}{2} - X_{in}\right)}{\left|\frac{X_{i-1}+X_i}{2} - X_i\right|\left|\frac{X_i+X_{i+1}}{2} - X_{in}\right|} \quad (5)$$

where $\Delta S_i$ is the arc-length of $i^{th}$ groove. This equation requires the knowledge of $X_{i+1}$, which is still unknown. However, with the constraint the fact that each $X_i$ is located at the center of the groove, the above expression can be reduced to the following expression without $X_{i+1}$.

$$\Delta S_i = 2|X_i - X_{in}|\arccos\frac{\left(\frac{X_{i-1}+X_i}{2}-X_{in}\right)\cdot(X_i-X_{in})}{\left|\frac{X_{i-1}+X_i}{2}-X_{in}\right||X_i-X_{in}|} = consi \quad (6)$$

Figure 7:
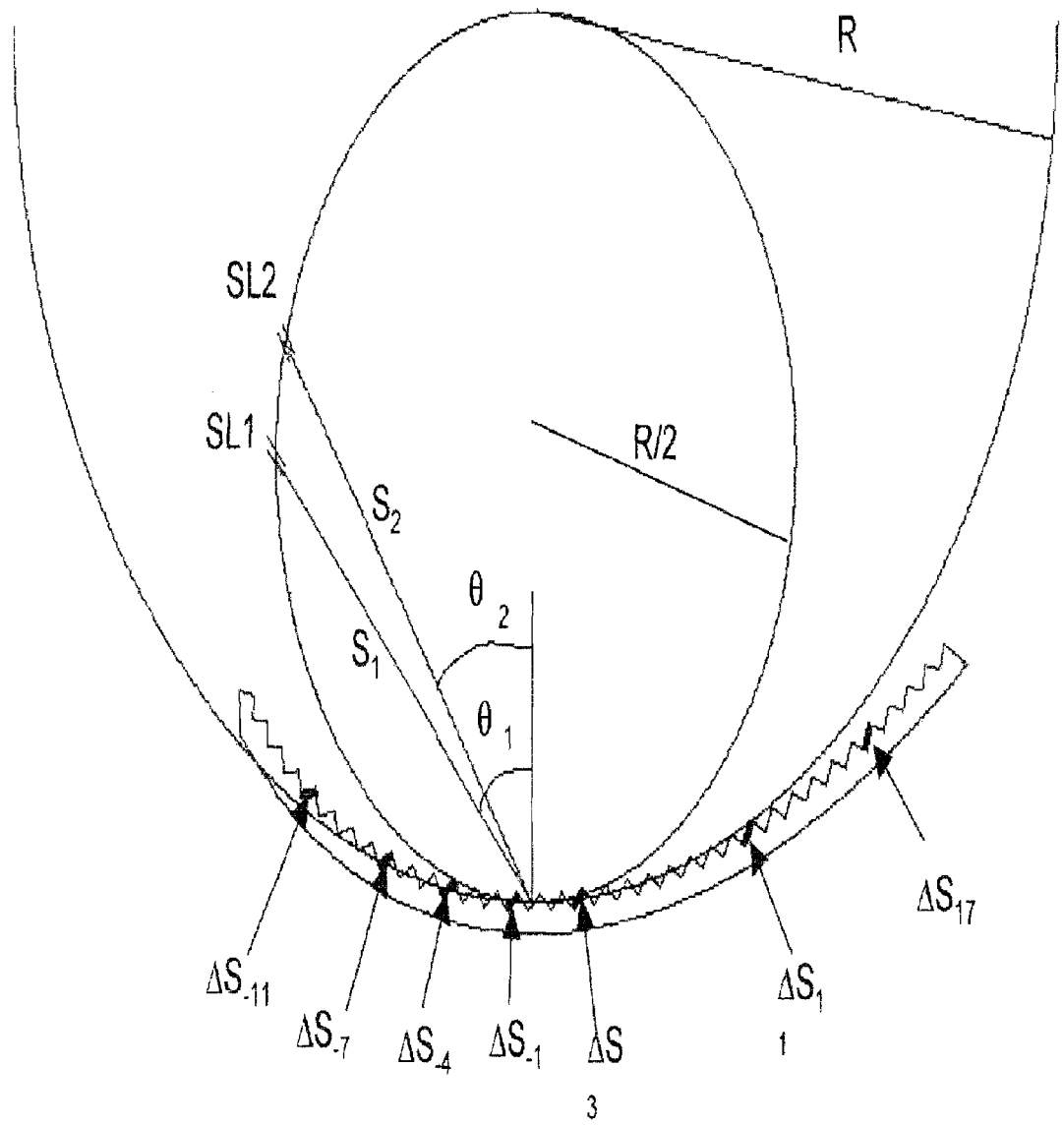
FIG. 7 shows a High Resolution Compact Curved Grating with Constant Arc, the detector and the entrance slit being present on a tangent circle, in accordance with an embodiment of the present invention.

FIG. 7 shows a specific example of the HR-CCG with constant arc-length of the grooves and detector or output slit (or waveguide) 506 at a tangent circle. The radius of curvature at the grating center is R=100 μm. Entrance slit or input slit (or waveguide) 502 is located at an angle $\Theta_1$=45° from grating normal and a distance $S_1$=70.71 μm from the grating center. Detector 506 is located at an angle $\Theta_2$ 37.37° and distance $S_2$=79.47 μm from the grating center. Both entrance slit or input slit (or waveguide) 502 and exit slit or output slit (and waveguide) 506 are located on a tangent circle of radius 50 μm. The groove spacing at the grating center is chosen to be d=4.2 μm so that diffraction order m=12 is directed toward detector 506 located at an angle $\Theta_2$ from the grating normal. Three initial grooves are located at $X_0$=(0, 0), $X_1$=(4.2, 0.008), and $X_{-1}$=(−4.2, 0.008) which form a circle of radius R=100 μm. Other groove locations $X_i$'s are obtained with the condition of arc-length of each groove $\Delta S_i$ is the same, i.e. $\Delta S_1$. Equation (2) and (6) are simultaneously solved for a $X_1$ with $X_{in}$=(−50, 50), $X_{det}$=(−48.24, 63.15), and $\Delta S_1$=4.201 μm for a given $X_{i-1}$. Groove locations, $X_i$'s calculated in this method are listed in Table 3. As shown in FIG. 7, grooves in this grating are not located on a tangent circle.

| | |
|---|---|
| $X_{-15}$ | (−55.43, 23.48) |
| $X_{-14}$ | (−52.90, 20.32) |
| $X_{-13}$ | (−50.07, 17.38) |
| $X_{-12}$ | (−46.98, 14.68) |
| $X_{-11}$ | (−43.67, 12.21) |
| $X_{-10}$ | (−40.17, 9.98) |
| $X_{-9}$ | (−36.52, 7.99) |
| $X_{-8}$ | (−32.74, 6.24) |
| $X_{-7}$ | (−28.84, 4.72) |
| $X_{-6}$ | (−24.86, 3.43) |
| $X_{-5}$ | (−20.81, 2.35) |
| $X_{-6}$ | (−16.71, 1.48) |
| $X_{-5}$ | (−20.81, 2.35) |
| $X_{-4}$ | (−16.71, 1.48) |
| $X_{-3}$ | (−12.57, 0.82) |
| $X_{-2}$ | (−8.39, 0.36) |
| $X_{-1}$ | (−4.20, 0.09) |
| $X_0$ | (0.00, 0.00) |
| $X_1$ | (4.20, 0.09) |
| $X_2$ | (8.39, 0.35) |
| $X_3$ | (12.57, 0.77) |
| $X_4$ | (16.73, 1.34) |
| $X_5$ | (20.86, 2.07) |
| $X_6$ | (24.97, 2.94) |
| $X_7$ | (29.04, 3.96) |
| $X_8$ | (33.07, 5.10) |
| $X_9$ | (37.06, 6.37) |
| $X_{10}$ | (41.01, 7.76) |
| $X_{11}$ | (44.91, 9.28) |
| $X_{12}$ | (48.77, 10.90) |
| $X_{13}$ | (52.57, 12.63) |
| $X_{14}$ | (56.33, 14.47) |

The above example has been illustration purposes only and should not in any way limiting the scope of the above-described embodiment or invention as a whole.

Figure 1A:
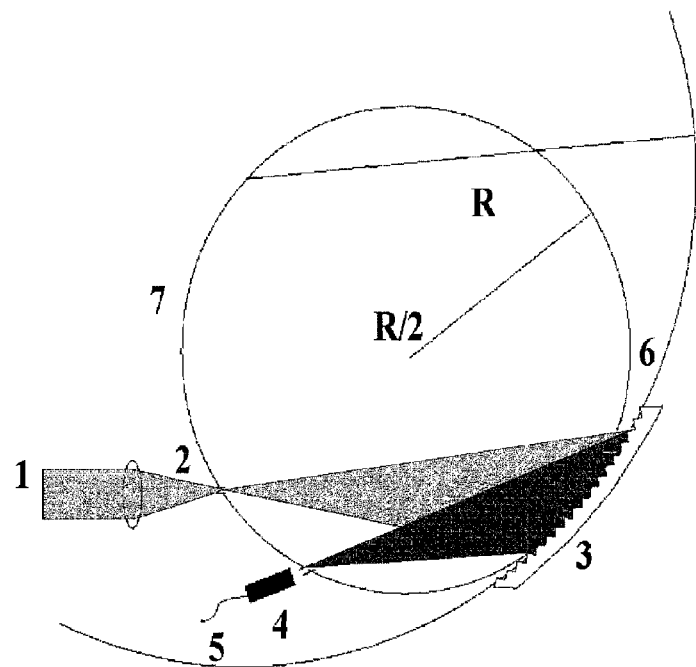
FIG. 1A and FIG. 1B show different views of a curved grating having the Rowland design.
Figure 1B:
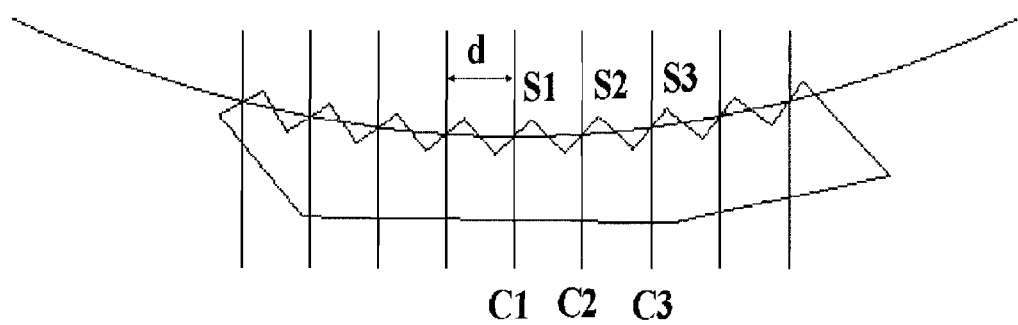
Figure 1C:
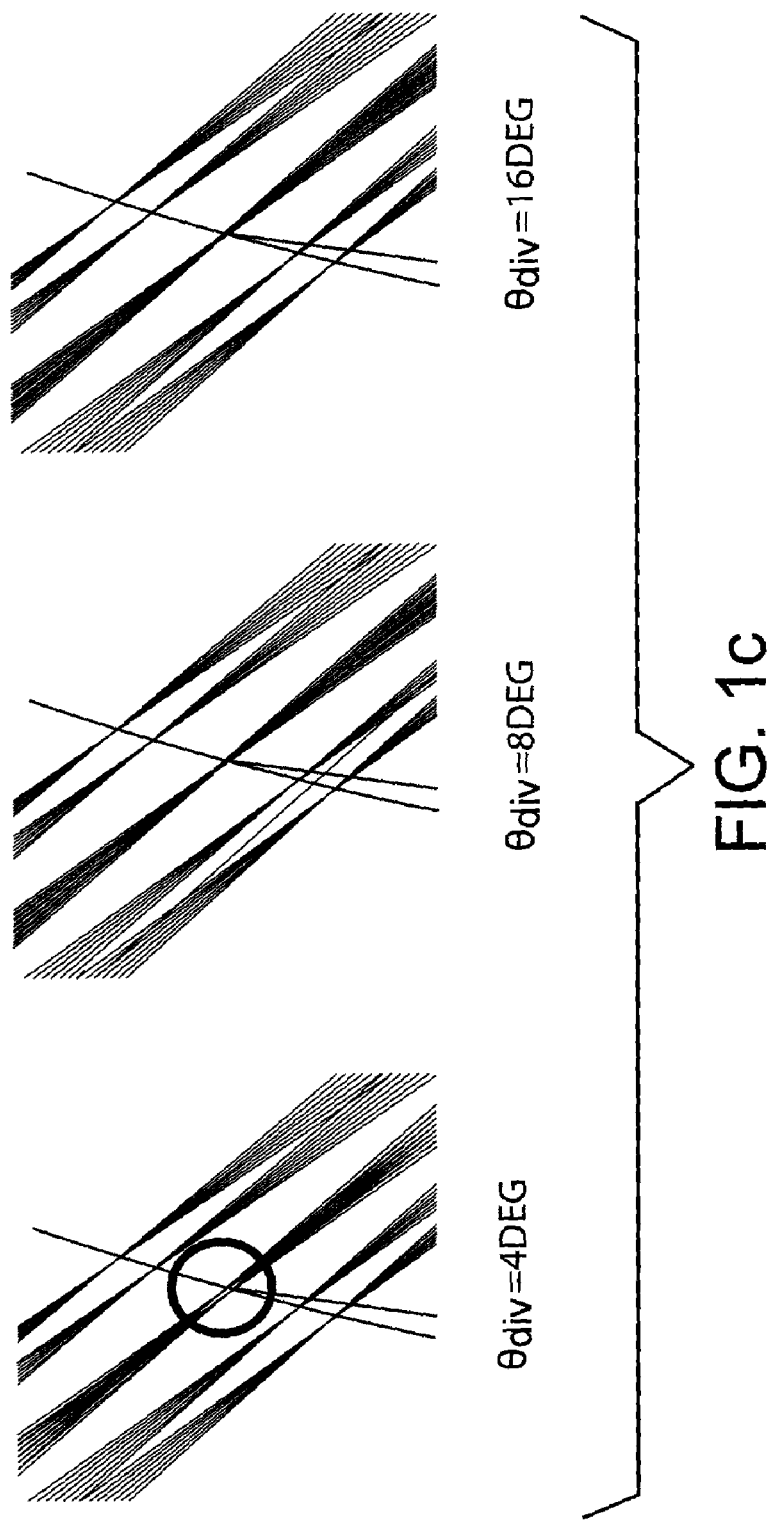
FIG. 1C shows ray-tracing for a Rowland grating design indicating focusing distortion or aberration at the exit slit for the cases where the input divergence angles are 4 DEG (left), 8 DEG (middle), and 16 DEG (right)
Figure 2:
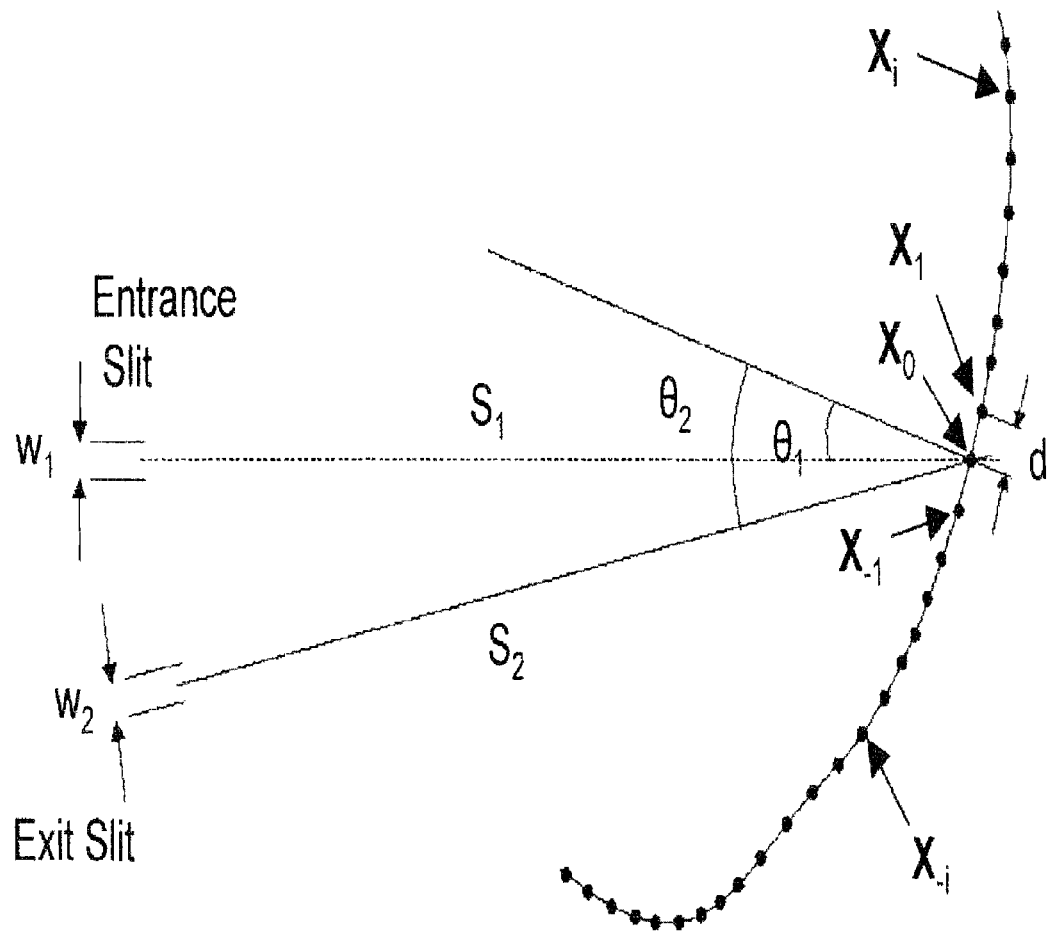
FIG. 2 shows the general specification of a curved-grating spectrometer.
Figure 3:
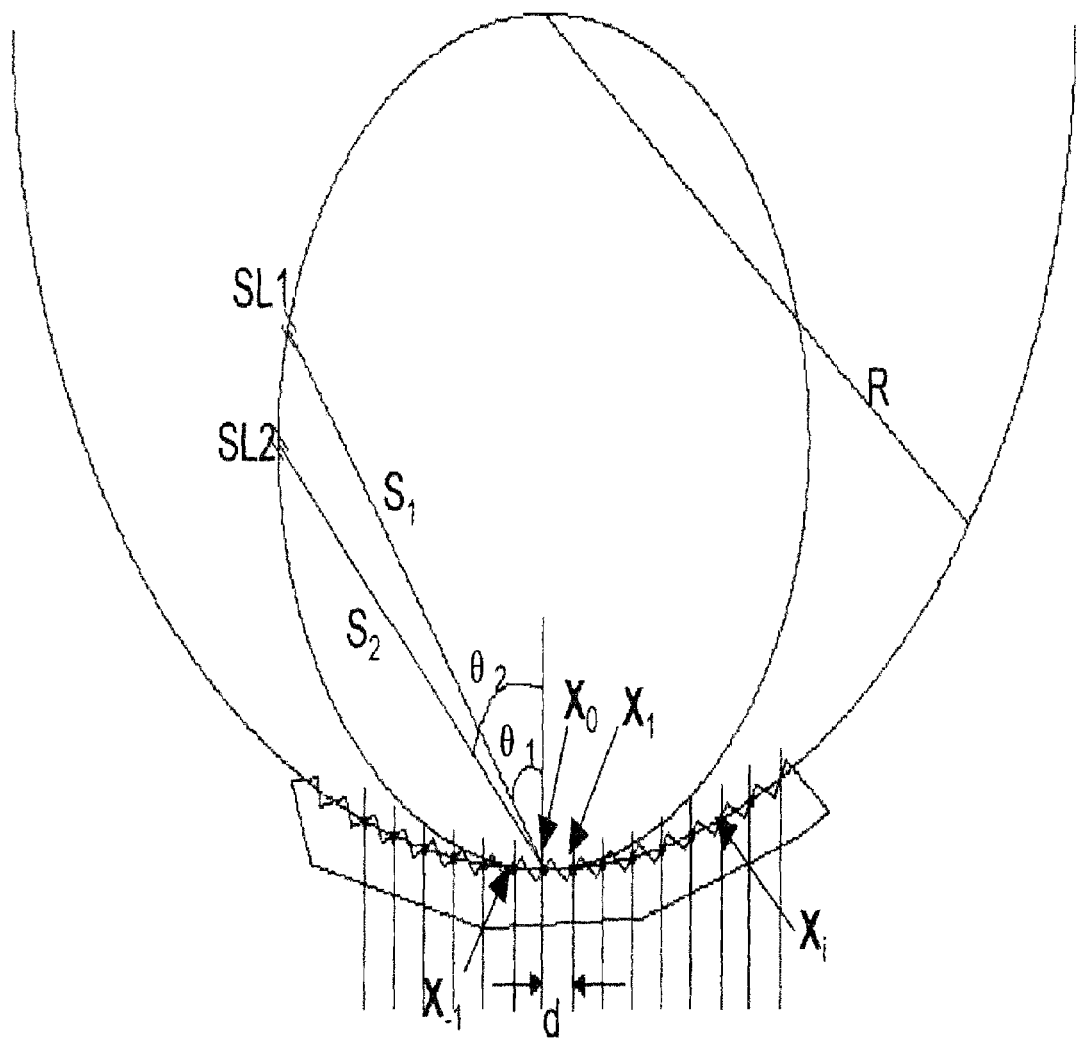
FIG. 3 illustrates the Rowland configuration specification for a Rowland curved grating.
Figure 4:
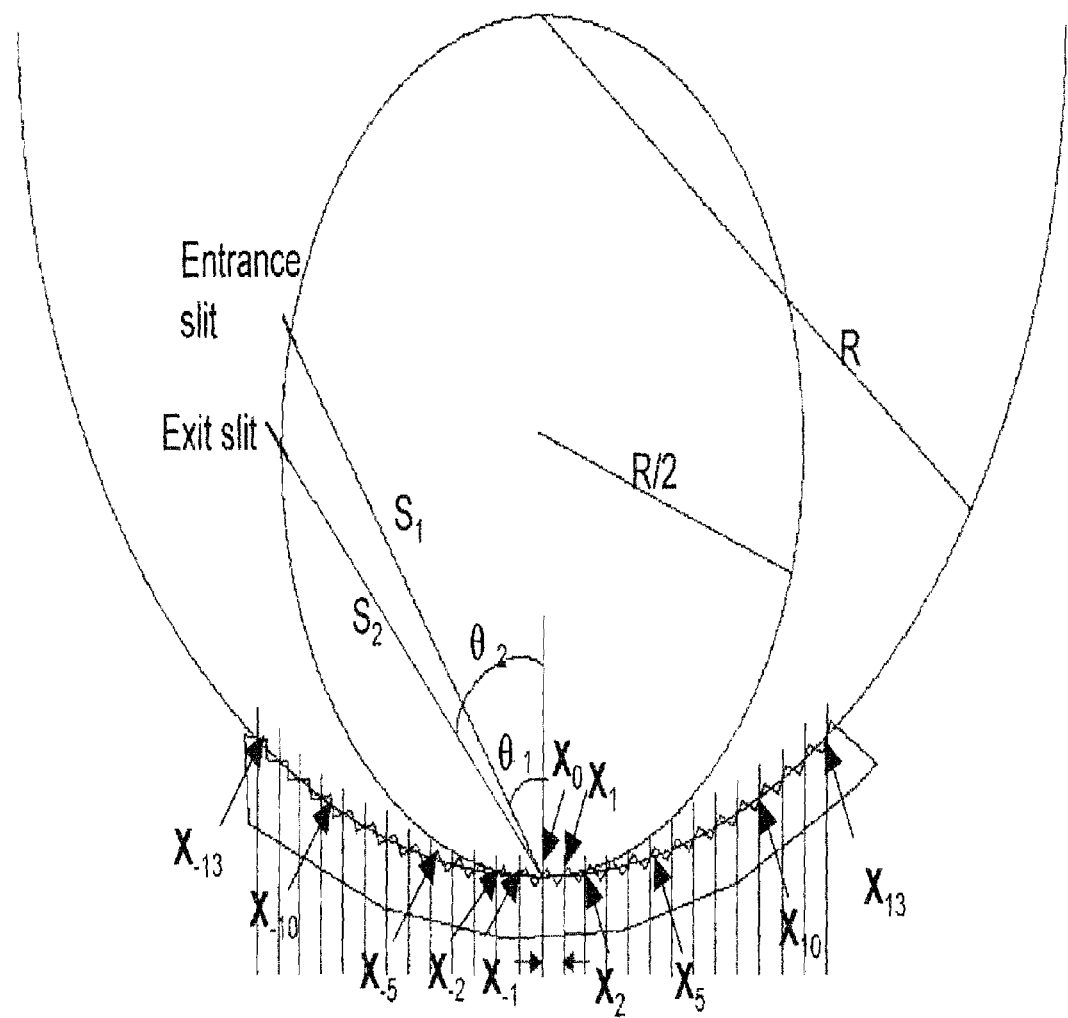
FIG. 4 shows a specific case of Rowland design curved grating.
Figure 8A:
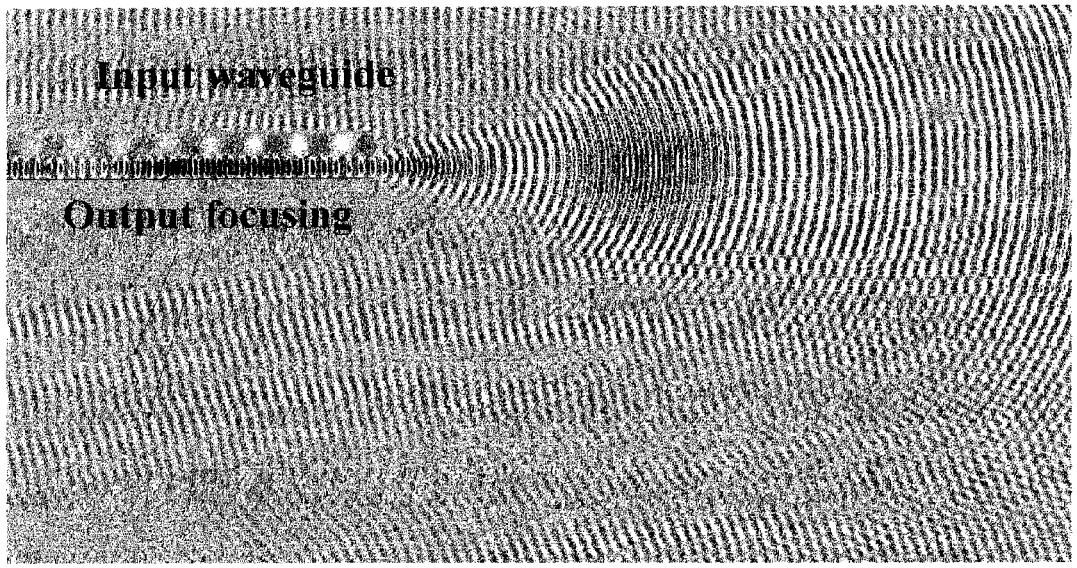
FIGS. 8A and 8B show a comparison between the Rowland design and the High Resolution Compact Curved Grating with constant groove (arc) length in accordance with the present invention.
Figure 8B:
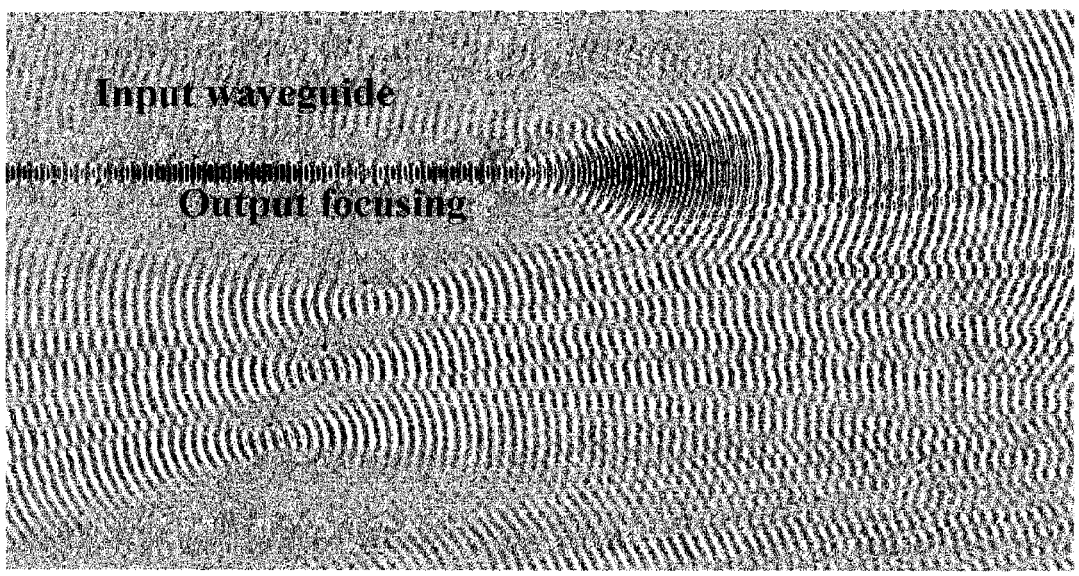

The performance of the HR-CCG with the constant arc-length and detector on a tangent circle is compared with a Rowland design with the same parameters such as $\theta_1$, $S_1$, $\theta_2$, $S_2$, R, m, d, and $\lambda_c$. It is a direct comparison of a Rowland curved-grating spectrometer described in FIG. 3 and a HRC-curved grating spectrometer described in FIG. 7. All the configuration parameters are the same for these two spectrometers except the grating itself. Particularly, the imaging properties, that is, how well entrance slit or input slit (or waveguide) 502 is sharply imaged at the detector location without aberration are compared. Imaging properties ultimately determine the resolution of a spectrometer. Finite Difference Time Domain (FDTD) method is used as a calculation method. FDTD is a Maxwell-equation solver, which evaluates electromagnetic wave within a spatial region for a certain period of time. By choosing a fine spatial grid size and temporal calculation step, the equation for an electromagnetic wave and its propagation can be solved with arbitrarily fine resolution. Imaging properties in these two curved-grating spectrometers is calculated by propagating a monochromatic light into entrance slit or input slit (or waveguide) 502 of each spectrometer. FDTD is run until the interference of beams from the entire grating groove is completed and forms an image of entrance slit or input slit (or waveguide) 502 at the detector location. The resulting snapshot of electric-field near the detector is taken for these two cases as shown in FIG. 8. Entrance slit or input slit (or waveguide) 502 width of 1 μm is used for both simulations and the wavelength of $\lambda$=1530, 1550, 1570 nm is used. In FIG. 8A shows the snapshot of electric field at the detector location for the Rowland design described in FIG. 3. As expected, the image of the entrance slit is blurred due to imperfect grating. For 1 μm entrance slit, the full diffraction angle is about $\theta_{div}$=50° and therefore, Rowland design breaks down. FIG. 8B shows the snapshot of electric field for the HR-CCG with constant arc-length grooves and detector on a tangent circle. In this case, a sharp aberration free image of entrance slit is formed at the detector location. The RS factor (RS=($\Delta\lambda/\lambda$)×(L/$\lambda$)) in this case is 0.6.

In an alternate embodiment, High-Resolution Compact Curved Grating has a constant arc with the detector or output slit (or waveguide) being present in-line. With reference to FIG. 7, this embodiment can be realized if the input and exit slits are located along a line such that S1≈S2. In another alternate embodiment, High-Resolution Compact Curved Grating has a constant arc with detector or output slit (or waveguide) 506 present at an arbitrary location.

In another alternative embodiment, High-Resolution Compact Curved Grating has a constant angle and detector 506 present on the circle of radius R, as depicted in FIG. 6. In this embodiment, each groove surface has an angular extension $(\Delta\theta)_i$ from entrance slit 502. In this example, the angular extensions $(\Delta\theta)_i$ are kept constant for all grooves. In addition, both entrance slit 502 and detectors 506 are located on a circle of radius R/2, where R is the radius of a circle formed by three initial groove locations X0, X1, and X2.

In as yet another alternate embodiment, High-Resolution Compact Curved Grating has a constant angle and detector or output slit (or waveguide) 506 is present on the circle of radius R/2, as depicted in FIG. 6. In this embodiment, each groove surface has an angular extension $(\Delta\theta)_i$ from entrance slit or input slit (or waveguide) 502. In this example, the angular extensions $(\Delta\theta)_i$ are kept constant for all grooves. In addition, both entrance slit or input slit (or waveguide) 502 and detectors or output slits (or waveguides) 506 are located on or near a circle of radius R/2, where R is the radius of a circle formed by three initial groove locations X0, X1, and X2.

In as yet another alternate embodiment, High-Resolution Compact Curved Grating has a constant angle with detector or output slit (or waveguide) 506 present at an arbitrary location.

Figure 14:
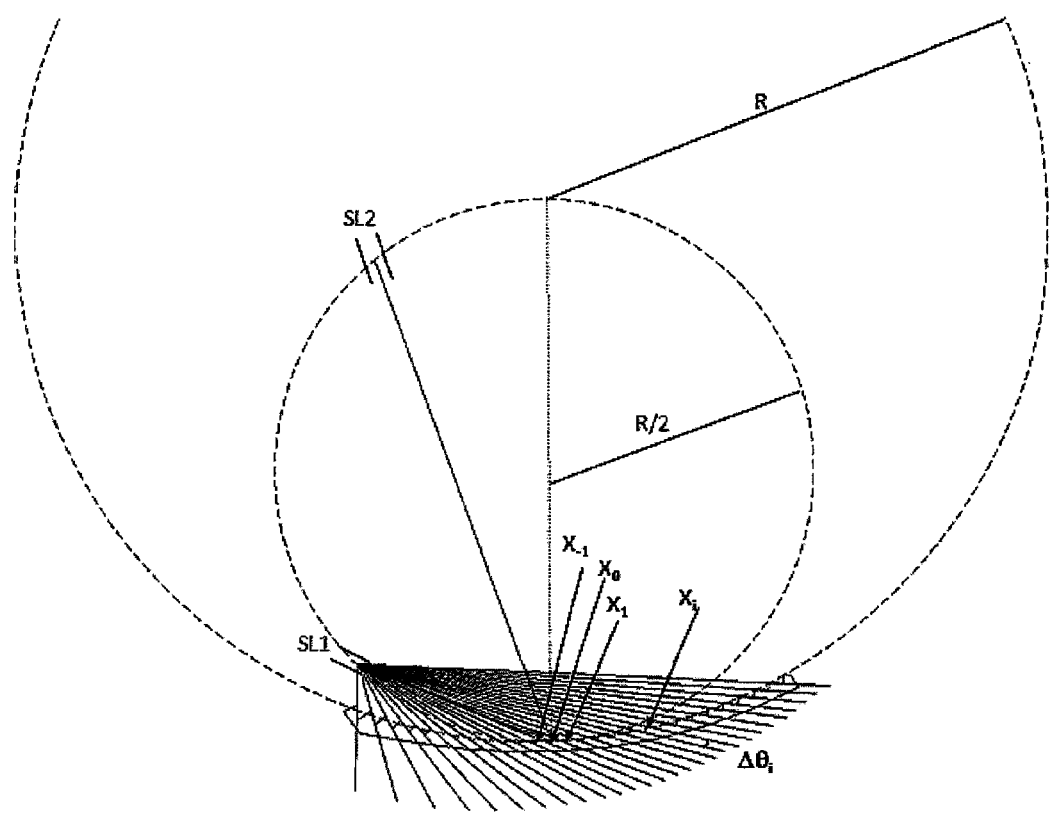
FIG. 14 illustrates a high resolution compact curved grating.

In as yet another alternate embodiment, High-Resolution Compact Curved Grating has groves lying on or near the circle of radius R (the near-Rowland Case) where R is the radius of a circle formed by three initial groove locations X0, X1, and X2, and the detector or output slit (or waveguide) 506 is present on the circle of radius R/2, as depicted in FIG. 14. In this embodiment, each groove surface has an angular extension $(\Delta\theta)_i$ from entrance slit or input slit (or waveguide). In this example, the angular extensions $(\Delta\theta)_i$ are chosen so that each groove lies on or near the circle of radius R. More specifically, the location of other grooves $X_i$'s are obtained by the following two conditions. The first condition being the path-difference between adjacent grooves should be an integral multiple of the wavelength in the medium, which is mathematically expressed as $$[d_1(\theta_1,S_1,X_i)+d_2(\theta_2,S_2,X_i)]-[d_1(\theta_1,S_1,X_{i-1})+d_2(\theta_2,S_2,X_{i-1})]=m\lambda/n, \quad (7)$$

Secondly, the angular locations of the grooves are chosen so that each groove is located at or near the circle of radius R throughout the HR-CCG, where R is the radius of a circle formed by three initial groove locations X0, X1, and X2.

In another alternate embodiment, the High-Resolution Compact Curved Grating with groves on or near the circle of radius R (the near-Rowland case) has detector or output slit (or waveguide) present at an arbitrary location.

While preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A wavelength multiplexer/demultiplexer suitable for analyzing a spectra composition of an optical beam, the wavelength multiplexer/demultiplexer enabling a detection of light of a particular wavelength, the wavelength multiplexer/demultiplexer comprising:

an input slit for allowing an entry of the optical beam into a spectrometer, a location of the input slit being adjustable for controlling a performance of the wavelength multiplexer/demultiplexer;

an output slit for allowing the exiting of the optical beam, a location of the output slit being adjustable for controlling the performance of the wavelength multiplexer/demultiplexer; and a curved grating for analyzing the spectra composition of the optical beam, the curved grating comprising a plurality of grooves, a distance between the grooves being dependent on the location of the input slit and the output slit, a center of operation wavelength, the diffraction order, a refractive index of the medium and on the location of the adjacent grooves, such that a path difference between two adjacent grooves is an integral of the center of operation wavelength, wherein an arc length of the grooves is the same.

2. The wavelength multiplexer/demultiplexer as recited in claim 1, wherein the input slit and the output slit are located on a tangent circle.

3. The wavelength multiplexer/demultiplexer as recited in claim 1, wherein the curved grating has one of a straight, sinusoidal and elliptical shapes.

4. The wavelength multiplexer/demultiplexer as recited in claim 1, wherein the spectrometer is in accordance with a Littrow configuration.

5. The wavelength multiplexer/demultiplexer as recited in claim 1, wherein the spectrometer is used as a wavelength dispersion element in a photonic integrated circuit.

6. The wavelength multiplexer/demultiplexer as recited in claim 1, wherein the wavelength multiplexer/demultiplexer is an isolated optical wavelength multiplexer/demultiplexer using discrete components, the discrete components including slits, gratings, spectrometer casing detector, detector array and motor drive.

7. The wavelength multiplexer/demultiplexer as recited in claim 1, wherein the wavelength multiplexer/demultiplexer is an integrated optical wavelength multiplexer/demultiplexer using an optical waveguide as the input slit and an optical waveguide as the output slit.

8. The wavelength multiplexer/demultiplexer as recited in claim 7, wherein the optical waveguides and the grating are fabricated on a single substrate.

9. The wavelength multiplexer/demultiplexer as recited in claim 1, wherein an arc length of each of the grooves is the same.

10. The wavelength multiplexer/demultiplexer as recited in claim 1, wherein an angular spacing of each of the grooves is the same.

11. The wavelength multiplexer/demultiplexer as recited in claim 1, wherein the grooves are at or near a circle of radius R where R is the radius of a circle formed by three initial groove locations.

12. A compact curved grating suitable for analyzing the spectra composition of an optical beam, the optical beam being incident on the compact curved grating via an input slit, the analyzed optical beam from the compact curved grating being incident on an output slit, the compact curved grating comprising a plurality of grooves, the distance between the grooves being dependent on the location of the input slit and the output slit, the center operation wavelength, a diffraction order, the refractive index of the medium and on the location of the adjacent grooves, such that a path difference between two adjacent grooves is an integral of the center of operation wavelength, wherein an arc length of the grooves is the same.

13. A method for analyzing a spectra composition of an optical beam, the method comprising:

adjusting a location of an input slit in order to have best performance at a particular design goal, the optical beam entering the wavelength multiplexer/demultiplexer through the input slit;

adjusting a location of an output slit in order to have best performance at a particular design goal, the spectra composition of the optical beam being separated by the output slit; and using a compact curved grating in order to analyze the spectra composition of the optical beam, the compact curved grating comprising a plurality of grooves, the step of using the compact curved grating further comprising the step of:

calculating initial groove spacing using the information relating to location of the input slit and the output slit, center of the operation wavelength, refractive index of the medium and the diffraction order; and determining the positions of other grooves, the positions being determined by ensuring that path difference between adjacent grooves is an integral multiple of the wavelength in the medium, according to the following mathematical expression:

$$[d_1(\Theta_1,S_1,X_i)+d_2(\Theta_2,S_2,X_i)]-[d_1(\Theta_1,S_1,X_{i-1})+d_2(\Theta_2,S_2,X_{i-1})]=m\lambda/n$$

wherein $d_1(\Theta_1,S_1,X_i)$ is a distance from one of the plurality of grooves located at $X_i$ from the entrance slit, $d_2(\Theta_2,S_2,X_i)$ is a distance from one of the plurality of grooves form the detector, m is a diffraction order and n is a refractive index of the medium, and further wherein an arc length of each of the grooves is the same; and adjusting the initial groove spacing and the positions of other grooves according to the calculating and determining steps.

* * * * *